(No Model.)
E. L. HUSSONG & G. B. ROBSON.
BICYCLE SUPPORT AND REST.
No. 587,039. Patented July 27, 1897.
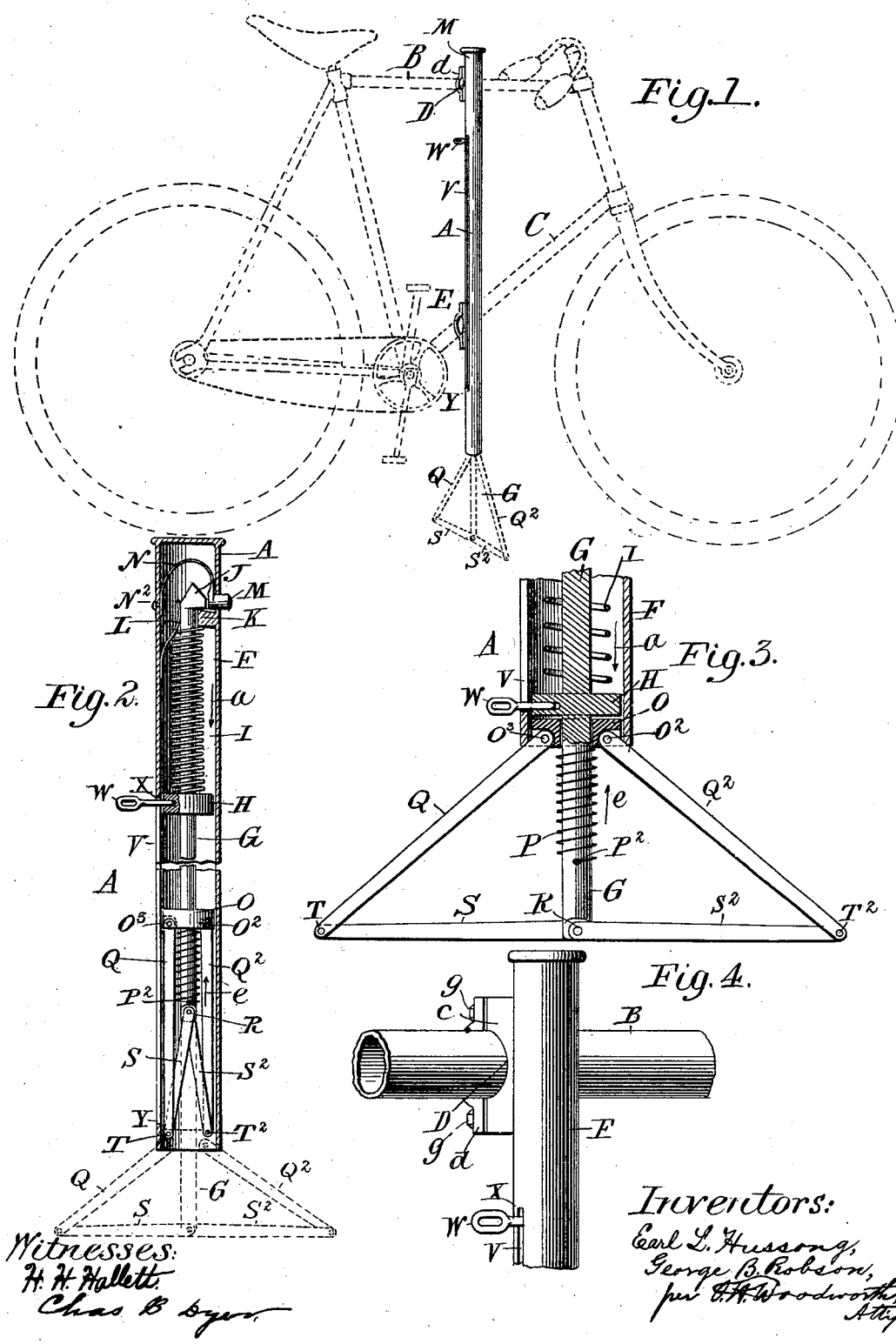
Witnesses:
H. H. Hallett
Chas. B. Dyer
Inventors:
Earl L. Hussong,
George B. Robson,
per E. H. Woodworth,
Atty.
THE NORRIS PETERS CO., PHOTO-LITHO., WASHINGTON, D. C.

UNITED STATES PATENT OFFICE.

EARL L. HUSSONG AND GEORGE B. ROBSON, OF TERRE HAUTE, INDIANA.

BICYCLE SUPPORT AND REST.

SPECIFICATION forming part of Letters Patent No. 587,039, dated July 27, 1897.

Application filed August 5, 1896. Serial No. 601,791. (No model.)

*To all whom it may concern:*

Be it known that we, EARL L. HUSSONG and GEORGE B. ROBSON, citizens of the United States, residing at Terre Haute, in the county of Vigo and State of Indiana, have invented certain new and useful Improvements in Bicycle Supports and Rests; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to certain mechanical devices and means adapted to serve as supports or rests for bicycles not in actual use or when the riders thereof have temporarily dismounted therefrom and desire said bicycles to stand upright without danger of being soiled or otherwise damaged by falling.

The principal objects of our invention are to provide ready and effective means for upholding and supporting bicycles in upright positions after their riders have dismounted therefrom or whenever unoccupied by riders, and thus avoid the usual and frequent necessity for and the difficulties and annoyances of finding some tree, fence, curb, bank, stone, or other suitable object by, on, against, or under which to support or rest riderless bicycles in upright positions; also, to provide effective and convenient means for attaching our invention to and detaching it from bicycles now in use.

We accomplish the aforesaid objects and others of a cognate nature substantially as herein described and as illustrated in the accompanying drawings, in which similar letters of reference indicate corresponding parts throughout the several views, and in which—

Figure 1 represents a side elevation of a bicycle provided with our bicycle support or rest as it appears when closed and attached to the upper and lower tubes constituting essential portions of the frame of the bicycle. Fig. 2 shows a vertical central sectional elevation of the various parts of our invention closed within its case, on line $a\,b$, transversely to and on a level with upper tube B of the bicycle-frame. Fig. 3 shows the relative positions and uses of the various operative parts of our invention when it is opened, expanded, and in actual use as a bicycle support or rest; and Fig. 4 represents the devices which we employ for readily attaching our invention to and detaching it from bicycle-frames as usually constructed.

In the drawings, A, Fig. 1, represents our bicycle support or rest transversely attached to and carried by the frame of a modern safety-bicycle.

B shows the usual upper horizontal bar or tube of the frame, and C the usual lower front tube thereof. Vertically across the tubes B and C is attached our bicycle-support A at the intersecting points D and E, said support being so attached as to be readily detached from the bicycle, as may be desired.

In Fig. 2, F represents the case, inclosing various operative parts of our invention.

G shows the actuating-rod, carrying the piston-head H, firmly affixed thereto and moving freely up and down within the case.

I shows a spiral spring, with its upper end resting against the projection K and its lower free end pressing downward on head H.

J is a catch near the upper end of rod G, adapted to engage with projection K, and thereby hold spring I compressed. Spring L is employed to hold catch J engaged with projection K, and said engagement can only be released by pressing inward on tripping-button M, protruding through the case, as shown, and held in position by spring N, formed integrally with or attached to said button and securely attached to the case at $N^2$.

O represents a spool moving freely up and down and loosely fitting the interior of the case, having the actuating-rod G passing freely through its center and having the upper ends of the two braces or arms Q and $Q^2$ jointed to its lower opposite sides at $O^2$ and $O^3$.

P shows a spiral spring surrounding rod G, attached thereto at $P^2$ and having its upper end pressing upward under spool O. At R the upper ends of the two spreading-arms S and $S^2$ are jointed to the lower end of rod G, and at T and $T^2$ arms S and $S^2$ are jointed to braces Q and $Q^2$, as shown.

In Fig. 4, $c$ shows the tube-holder, securely brazed or otherwise firmly affixed to case F at D and adapted to receive the tube-holder cap $d$, said holder $c$ and cap $d$ being suitably shaped to receive and firmly hold case F to tube B when cap $d$ is forcibly drawn to holder $c$ by the screws $g$ $g$.

The spring-compressing pin W is inserted in head H and extends outward therefrom through slot X, formed in case F, said outward extension of pin W being so shaped as to form a small knob or handle to be drawn upward to compress spring I, and thereby connect catch J with projection K and at the same time draw the rod G, arms S and $S^2$, braces Q and $Q^2$, and spring P within the case.

The case F may be attached at E to tube C of the frame in practically the same manner as it is attached at D, Fig. 4, to tube B, due allowance being made for the different angles at which the case intersects the tubes at D and E, respectively.

Although we sometimes attach our invention to bicycles perpendicularly, it is not always necessary to do so, as it may be attached with its top leaning backward or forward from a perpendicular position without causing the base of the support to strike the ground unevenly when the force of spring I is liberated and applied to head H by tripping the connection of catch J and projection K, as set forth.

Having thus indicated the various parts or elements constituting our invention, we will now describe its practical application and operation, as follows:

Our bicycle support or rest A being securely attached to the upper and lower tubes of the frame of a bicycle, as described and shown in Figs. 1 and 4, and the principal operating parts of the invention being drawn up in and inclosed within the case, as shown in Figs. 1 and 2, (and the rider having dismounted,) when we desire to apply our invention to practical use we simply press inward on tripping-button M, and thus trip the connection between catch J and projection K, whereupon spring I instantly forces rod G and head H downward in the case, as per arrow $a$, whereby arms S and $S^2$, braces Q and $Q^2$, rod G, spring P, head H, and spool O are all pressed downward and mostly out of the case, and owing to the aforesaid parts or elements of our invention being all mechanically connected together in the manner heretofore described the pressure of spring I forces them toward, to, or below the lower end of the case, and the two arms, two braces, rod, and spool assume the form of the two-way bracing bicycle support or rest, with its base on the ground transversely to the line of the usual forward movement of the bicycle, as described and shown in Figs. 1, 2, and 3. When the downward pressure of spring I has fully extended and expanded the rod, arms, and braces, as in Fig. 3, head H at the same time is forced down onto spool O and pin W reaches the lower end of slot V at Y and is there stopped, and thus any further downward movement of said head and spool and any further extension or expansion of the rod, arms, and braces are effectually prevented.

What we claim as our invention, and desire to secure by Letters Patent of the United States, is—

1. In a bicycle support and rest, the case F, and the rod G, spool O, spring I, piston-head H, arms Q and $Q^2$, and braces S and $S^2$, normally drawn up within said case, in combination with slot V, stop Y, stop X, pin W, tripping-button M, catch J, spring L, spring P, and means for attaching said case to the bicycle-frame, substantially as set forth.

2. The combination of the case, the rod G, the spool O, centrally through which said rod passes, the braces Q and $Q^2$, having their upper ends jointed to the lower opposite sides of said spool and their lower ends jointed to the lower ends of arms S and $S^2$, said arms having their upper ends jointed to the lower end of rod G, and the spiral spring P, surrounding rod G, having its lower end fastened thereto, at $P^2$, and its upper free end pressing upward against the under side of spool O, substantially as and for the purposes described and illustrated.

3. A bicycle support or rest with a case inclosing operative parts thereof transversely attached to the tubes of the bicycle-frame, in combination with the means described for securely attaching the case to the tube or tubes of the bicycle-frame, the actuating-rod within the case, the piston-head on said rod, the spring-compressing pin, the slot in said case for the movements of said pin, the spiral spring for carrying the actuating-rod downward, the projection K, the catch J, the spring L, the spring N, the tripping-button, the spool O, centrally through which rod G passes, the two braces jointed to said spool, the two arms jointed to said braces and to the lower end of rod G, and the spiral spring P, all substantially as set forth and for the purposes specified.

EARL L. HUSSONG.
    GEORGE B. ROBSON.

Witnesses:
 J. E. HERMAN,
 A. B. HUSSONG.